(12) United States Patent
Massonnat

(10) Patent No.: US 10,274,641 B2
(45) Date of Patent: Apr. 30, 2019

(54) METHOD OF ASSISTANCE IN GEOLOGICAL MODELING BY GROUPING MESHES TOGETHER

(71) Applicant: TOTAL SA, Courbevoie (FR)

(72) Inventor: Gérard Massonnat, Pau (FR)

(73) Assignee: Total SA, Courbevoie (FR)

( * ) Notice: Subject to any disclaimer, the term of this patent is extended or adjusted under 35 U.S.C. 154(b) by 532 days.

(21) Appl. No.: 14/420,153

(22) PCT Filed: Aug. 6, 2013

(86) PCT No.: PCT/FR2013/051900
§ 371 (c)(1),
(2) Date: Feb. 6, 2015

(87) PCT Pub. No.: WO2014/023916
PCT Pub. Date: Feb. 13, 2014

(65) Prior Publication Data
US 2015/0226877 A1    Aug. 13, 2015

(30) Foreign Application Priority Data
Aug. 6, 2012 (FR) .................................... 12 57647

(51) Int. Cl.
*G06F 17/10* (2006.01)
*G06G 7/48* (2006.01)
*G01V 99/00* (2009.01)

(52) U.S. Cl.
CPC ............ *G01V 99/005* (2013.01); *G06F 17/10* (2013.01)

(58) Field of Classification Search
CPC ............................. G01V 99/005; G06F 17/10

USPC ................................................... 703/2, 9, 10
See application file for complete search history.

(56) References Cited

U.S. PATENT DOCUMENTS

| | | | | |
|---|---|---|---|---|
| 5,661,698 A | * | 8/1997 | Cacas | G01V 1/282 367/73 |
| 6,928,399 B1 | * | 8/2005 | Watts, III | E21B 49/00 702/13 |
| 2012/0026167 A1 | * | 2/2012 | Ran | G06T 17/205 345/420 |

OTHER PUBLICATIONS

International Search Report and Written Opinion for PCT/FR2013/051900, dated Nov. 12, 2013, 8 pages.
(Continued)

*Primary Examiner* — Andre Pierre Louis
(74) *Attorney, Agent, or Firm* — Patterson Thuente Pedersen, P.A.

(57) ABSTRACT

The present invention relates to a method of assistance in geological modeling by grouping meshes together in a geological model comprising a plurality of meshes, each mesh of said model being associated with at least one digital parameter representing a geological property. For at least one column of at least n meshes of the model, a plurality of decompositions of said column into m subsets of adjacent meshes can be determined. Then, for each composition determined, one determines, for each one of the m subsets, a new digital parameter associated with said subset depending on the digital parameters associated with the meshes of said subset. Finally, one can determine a dispersion value of said decomposition depending, at least, on the new digital parameters associated with said subsets.

14 Claims, 6 Drawing Sheets

(56) References Cited

OTHER PUBLICATIONS

English translation of International Search Report and Written Opinion for PCT/FR2013/051900, dated Nov. 12, 2013, 7 pages.
David Stern:. "Practical Aspects of Scaleup of Simulation Models", Journal of Petroleum Technology, vol. 57, No. 9, Sep. 2005 (Sep. 2005) XP055060786, ISSN: 0149-2136, DOI: 10.2118/89032-MS.

* cited by examiner

METHOD OF ASSISTANCE IN GEOLOGICAL MODELING BY GROUPING MESHES TOGETHER

RELATED APPLICATIONS

The present application is a National Phase entry of PCT Application No. PCT/FR2013/051900, filed Aug. 6, 2013, which claims priority from French Patent Application No. 12 57647, filed Aug. 6, 2012, said applications being hereby incorporated by reference herein in their entirety.

FIELD OF THE INVENTION

The present invention relates to the field of computer simulation of data in a meshed model, notably the field of computer simulation of data representing geological information.

BACKGROUND OF THE INVENTION

In the context of oil mining, the improvement of the hydrocarbon recovery rate in a well requires knowing the geological structure of the soil containing this well as accurately as possible. Much information is gathered in situ over the lifetime of the oilfield, then is analyzed and finally combined to create numerical geological models.

The number of meshes of such models can be in the neighborhood of several million when creating fine models. With current technology, it is not always possible to use these fine models in dynamic simulations, flow simulators only managing to handle models exceeding 500,000 mesh cells with difficulty.

Thus, geologists and reservoir engineers simplify these models to reduce the number of mesh cells while conserving as well as possible the information they possess: coarse models are then obtained.

However, such simplifications are not without defects.

This simplification step is difficult because certain simplifications, useful to geologists, compromise other simplifications desired by reservoir engineers, and vice versa. Indeed, geologists propose models by grouping together certain mesh cells according to their own judgment or analysis. These models are used for the evaluations of the production capacity and then validated (or invalidated) by the reservoir engineers. This simplification is therefore very detailed and requires many exchanges between geologists and reservoir engineers in order to obtain the best envisionable compromise.

There is thus a need to effectively simplify the models used for such simulations.

The present invention will improve the situation.

SUMMARY OF THE INVENTION

For this purpose, the present invention proposes to combine the constraints of the geologists and the reservoir engineers and to propose several optimized solutions of mesh groupings in order to reduce the final number of mesh cells of the model.

The present invention then pertains to a method of grouping mesh cells in a meshed geological model of one to three dimensions, the geological model including a plurality of mesh cells, and each mesh cell of said model being associated with at least one numerical parameter representing a geological property.

The method includes the steps:

for at least one column of at least n mesh cells of the model:
a/ determining a plurality of decompositions of the column into m subsets of adjacent mesh cells, m being a positive or zero integer less than or equal to n;
for each decomposition determined:
a1/ for each of the m subsets, determining a new numerical parameter associated with said subset as a function of the numerical parameters associated with the mesh cells of said subset; a2/ determining a dispersion value of said decomposition as a function, at least, of the new numerical parameters associated with said subsets determined in step a1/;
b/ supplying said decompositions associated with their dispersion value,
n is a strictly positive integer.

The term "geological property" refers to any physical property of a soil having to do with either its composition, its structure, its evolution, etc. By way of illustration, this property can correspond to the type of majority facies of the soil corresponding to said mesh cell. Furthermore, said property can correspond to the porosity of the soil, the presence or otherwise of fractures, the direction of flow, etc. of the soil corresponding to said mesh cell.

The term "column" refers to any set of consecutive mesh cells of the model along a direction of this same model. Thus, if the model is meshed cubically and regularly, the model being oriented according to an orthonormal reference frame $(0, \vec{x}, \vec{y}, \vec{z})$, a column can be composed in the direction $\vec{z}$ of a set of cubic mesh cells "stacked" vertically on top of each other. It can be advantageous that the position of this column in the model corresponds to the position of a drilling well.

"A subset of adjacent mesh cells" refers to a set of mesh cells each possessing at least one face in common with one of the other mesh cells.

Thus, the determined decomposition does not include any subset of disconnected mesh cells and can allow the subsequent creation of a new model with coarse mesh cells corresponding to these subsets.

The "new numerical parameter of a subset" can be determined, for example, by taking an average, a weighted average, a thresholding, etc. of the various numerical parameters associated with the mesh cells of this subset.

The "dispersion value of a decomposition" can be determined, for example by computing the variance of the new numerical parameters of the subsets of this decomposition.

Once the decompositions are supplied in association with their dispersion values, it is possible to perform a large number of additional operations. Indeed, the geologist and the reservoir engineer try to optimize a certain number of sometimes conflicting parameters, and making these decompositions available as well as their dispersion values can allow them to perform an arbitration of this kind. This arbitration can be, for the purpose of illustration, an arbitration between the simulation times linked to the numbers of mesh cells of the model and the accuracy of the simulation linked to the proximity of the model with geological reality (which can depend on the dispersion value).

In addition, the method can furthermore comprise:
c/ ordering said decompositions supplied in step b/ according to the dispersion value determined for each of the decompositions;
d/ supplying an ordered list of said decompositions.

The classing of the decompositions according to the determined dispersion value can allow the end user to simplify his arbitration by allowing him to select more rapidly the target decomposition as a function of his aims (for example, speed of simulation and/or accuracy).

Advantageously, the steps being able to be executed for a plurality of columns, the columns being able to be distinct and pair-wise parallel, each decomposition determined for a column of the plurality of columns can have an equivalent decomposition in each of the other columns. Then, the method can furthermore comprise:

e/ for each decomposition of the columns of the plurality of columns, correcting the determined dispersion values as a function of the dispersion value of the decomposition and the dispersion values of the equivalent decompositions of the other columns.

Indeed, it is not rare that many drilling wells (operating or prospecting wells) are produced in a limited geographical region. Thus, one model can comprise several columns representing these drilling wells.

The term "decomposition equivalent to a decomposition of a column" refers to a decomposition of a representation identical to a decomposition in another column. For example, a decomposition in a first column can group together the first three mesh cells of this column into a first subset, then the next ten mesh cells into a second subset, etc. The decomposition equivalent to this decomposition then comprises the same groupings, but on a separate second column: the first three mesh cells of this second column into a first subset, then the next ten mesh cells of the second column into a second subset, etc.

This correction can provide a better account of the geological reality of the soil and thus make it possible to perform better arbitrations between various coarse meshes. Indeed, it can be possible to choose a decomposition (and therefore a new meshing of a coarse model) among the decompositions with the best dispersion value, doing so for a majority of columns among the columns of the model.

This correction can consist in attributing a same dispersion value to all the columns for the equivalent decompositions. This same value can, for example, be the average of the dispersion values of the equivalent decompositions of the different columns or be one of the dispersion values of the columns.

Furthermore, each column including an importance parameter, the dispersion value of each decomposition can be a function of said importance parameter of the column.

The term "importance parameter" refers to a parameter making it possible to weight the importance of certain wells and therefore of the columns of mesh cells associated with these drilling wells. For example, this importance parameter can be a function of the flowrate of the well, the forecast of production capacity of the well, the well size (main well, secondary wells, etc.).

Indeed, it is possible to favor the modeling of certain wells by attributing to the corresponding columns an importance parameter (numerical parameter, decimal for example) of different values. Then, the dispersion value previously computed can be weighted by this importance parameter.

In an embodiment of the invention, all the possible decompositions of the column can be determined in step a/. It is thus possible to exhaustively explore, without a priori or postulate, all the possible decompositions of the column.

Advantageously, each mesh cell of the column can be associated with a completion value (numerical for example) representing a degree of completion of the mesh. Thus, the plurality of decompositions can be determined in step a/ in such a way that the completion value of each mesh cell of each of the m subsets can differ from the completion values of the other mesh cells of the same subset by at most a determined threshold.

For example, if the decomposition includes two groupings (the first subset corresponding to the first ten mesh cells of the column and the second subset corresponding to the other mesh cells of the column), the spread of values of maximum completion between two mesh cells of the first subset does not exceed this threshold.

Furthermore, the determined threshold can be less than half the difference between the highest completion value and the lowest completion value associated with the mesh cells of the column.

Thus, if the completion values of the mesh cells of the column lie between 0 and 10, the threshold is below 5. Thus, if the mesh cells have as respective completion values (in the order of the column) 1, 3, 2, 9, 8, 1, 5, 3, then the decomposition can correspond to the grouping of the first three mesh cells (because the spread of values 1, 3, 2 is of a maximum of 2, or a spread below 5), of the next two (because the spread of values 9, 8 is of a maximum of 1, or a spread below 5) and of the next three (because the spread of the values 1, 5, 3 is of a maximum of 4, or a spread below 5).

On the other hand, the decomposition cannot correspond to the grouping of the first 4 mesh cells (because the spread of the values 1, 3, 2, 9 is of a maximum of 8, or a spread above 5), and of the next four mesh cells (because the spread of the values 8, 1, 5, 3 is of a maximum of 7, or a spread above 5).

Advantageously, the geological model can be a two or three-dimensional meshed model, and each mesh cell of each column can be associated with a completion value representing a degree of completion of the mesh cell. Furthermore, each mesh cell of the first column can be associated with a completion value associated with a mesh cell of the second column, known as the virtual completion value.

Thus, the plurality of decompositions for the first column can be determined in step a/ in such a way that the virtual completion value of each mesh cell of each of the m subsets can differ from the virtual completion values of the other mesh cells of the same subset by at most a determined threshold.

Thus, it is possible to associate with a mesh cell of the first column the completion value of a corresponding mesh cell in a second column. It is possible to take a mesh cell from the second column with a same coordinate with the mesh cell of the first column. For example, in a two-dimensional model the space of which is defined by the orthonormal frame of reference $(0, \vec{x}, \vec{z})$, and if the columns are oriented along the axis $\vec{z}$, it is possible to associate a mesh cell of the first column with a mesh cell of the second column if these two mesh cells possess one and the same coordinate along the axis $\vec{z}$ (i.e. if these two mesh cells are found at the "same depth" in the column).

Advantageously, the use of constraints external to the column can ensure that the decompositions determined for one column of the model are compatible with the decompositions determined for the other columns of the model. It is thus possible to ensure that the columns possess at least an equivalent decomposition with the other columns.

In an embodiment of the invention, one of the thresholds determined above can be equal to 0.

Thus, in a subset, the determination values of the mesh cells can be identical.

Furthermore, the determined threshold can be less than half the difference between the highest virtual completion value and the lowest virtual completion value associated with the mesh cells of the first column.

In an embodiment, the dispersion value of a decomposition can be determined as a function of the interclass variance of the determined subsets.

"Interclass variance of the subsets" refers to the variance of the set composed of the new numerical parameters associated with the subsets of a decomposition computed in step a1/.

When the interclass variance is maximal, this can mean that the heterogeneity of the mesh cell values has been complied with during groupings.

Advantageously, each mesh cell of the column is able to be associated with a heterogeneity value (numerical, for example) representing a geological parameter of the soil, the plurality of decompositions can be determined in step a/ in such a way that the heterogeneity value of each mesh cell of each of the m subsets can differ from the heterogeneity values of the other mesh cells of the same subset by at most a determined threshold.

"Heterogeneity value" refers to a numerical value representing a geological parameter the heterogeneity of which one wishes to preserve during decompositions.

A device intended for groupings of mesh cells in a meshed geological model can be advantageous, in itself.

Thus, the present invention also addresses a device for grouping mesh cells in a one to three-dimensional meshed geological model, the geological model including a plurality of mesh cells, each mesh cell of said model being associated with at least one numerical parameter representing a geological property, the device including:
an electronic circuit capable of, for at least one column of at least n mesh cells of the model:
  determining a plurality of decompositions of the column into m subsets of adjacent mesh cells, m being a positive or zero integer less than or equal to n; for each determined decomposition:
    a1/ for each of the m subsets, determining a new numerical parameter associated with said subset as a function of the numerical parameters associated with the mesh cells of said subset;
    a2/ determining a dispersion value of said decomposition as a function, at least, of the numerical parameters associated with said subsets;
an output interface for supplying said decompositions associated with their dispersion value,
and wherein n is a strictly positive integer.

A computer program, implementing all or part of the method described above, installed on a pre-existing item of equipment, is in itself advantageous, provided that it allows the grouping of mesh cells in a meshed geological model. Thus, the present invention also addresses a computer program including instructions for the implementation of the method described previously, when this program is executed by a processor.

FIG. 4 described in detail below, can form the flowchart of the general algorithm of such a computer program.

Other features and advantages of the invention will become further apparent upon reading the following description. The latter is purely illustrative and must be read with respect to the appended drawings in which:

DETAILED DESCRIPTION OF THE DRAWINGS

Figure 1A:
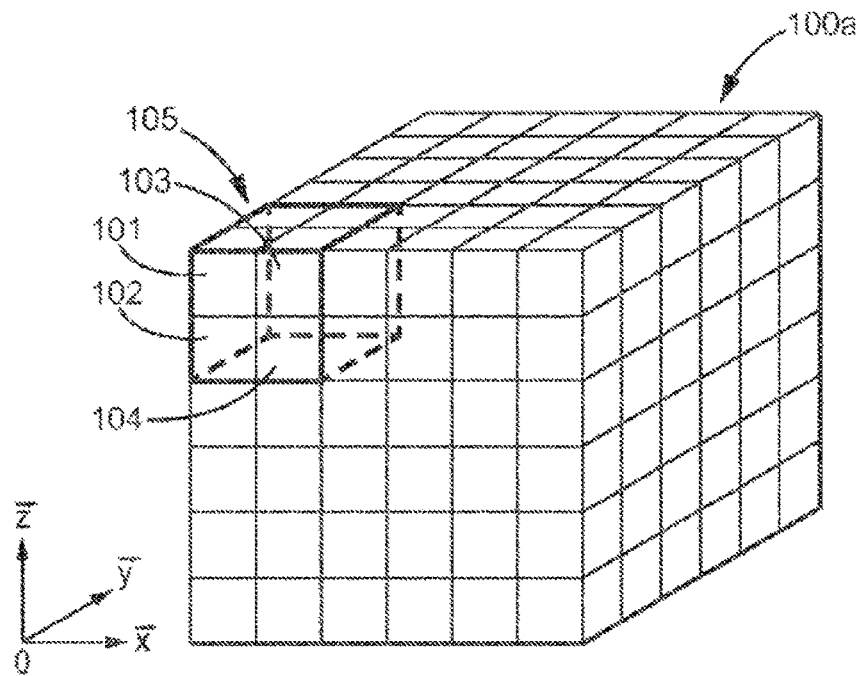
FIGS. 1a and 1b illustrate a remeshing of a three-dimensional geological model.

The geological model of FIG. 1a (known as the fine model) is represented by a meshed cube 100a meshed with 216 mesh cells (i.e. 6×6×6 mesh cells). Each mesh cell, known as a fine mesh cell (i.e. 101, 102, 103, 104, etc.) has coordinates in the space formed by the orthonormal frame of reference $(0, \vec{x}, \vec{y}, \vec{z})$.

Nevertheless, this large number of mesh cells can be a handicap for intensive mathematical calculations on the geological model, such as simulations of fluid flows or geological deformations. It is thus advantageous to group certain mesh cells together, for example, in groups of 8 (e.g. 2×2×2) or else in groups of 4 (e.g. 4×1×1).

Figure 1B:
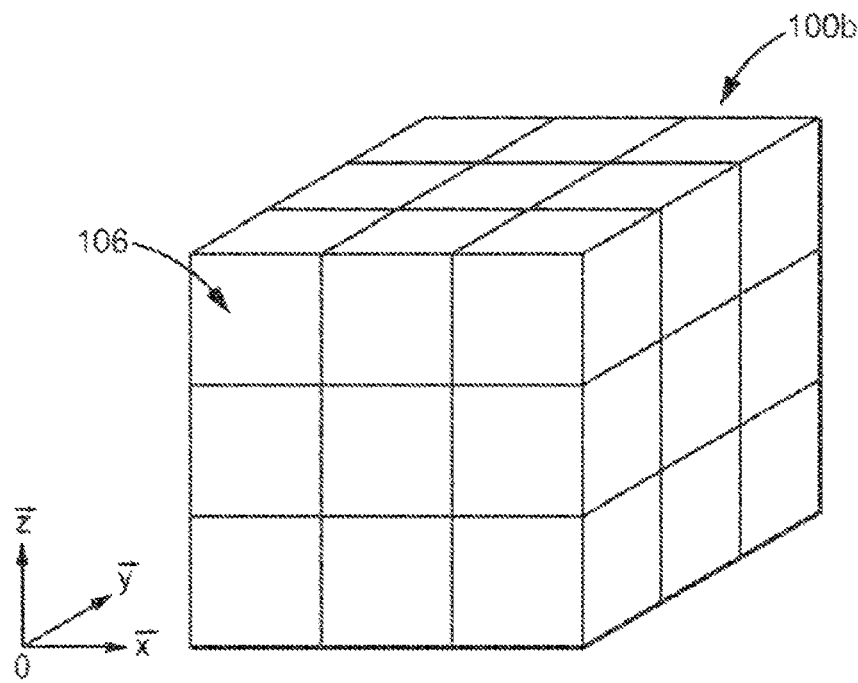

FIG. 1b illustrates such a grouping. The geological model (known as the coarse model) of FIG. 1b is represented by a meshed cube 100b of 27 mesh cells (i.e. 3×3×3 mesh cells). Each mesh cell, known as a coarse mesh cell (i.e. 106, etc.) has coordinates in the space formed by the orthonormal frame of reference $(0, \vec{x}, \vec{y}, \vec{z})$ and can be put in correspondence with 8 fine mesh cells of the fine model. The grouping of the 8 fine mesh cells corresponding to the cube 106 of FIG. 1b is highlighted by the cube 105 in FIG. 1a.

Figure 2:
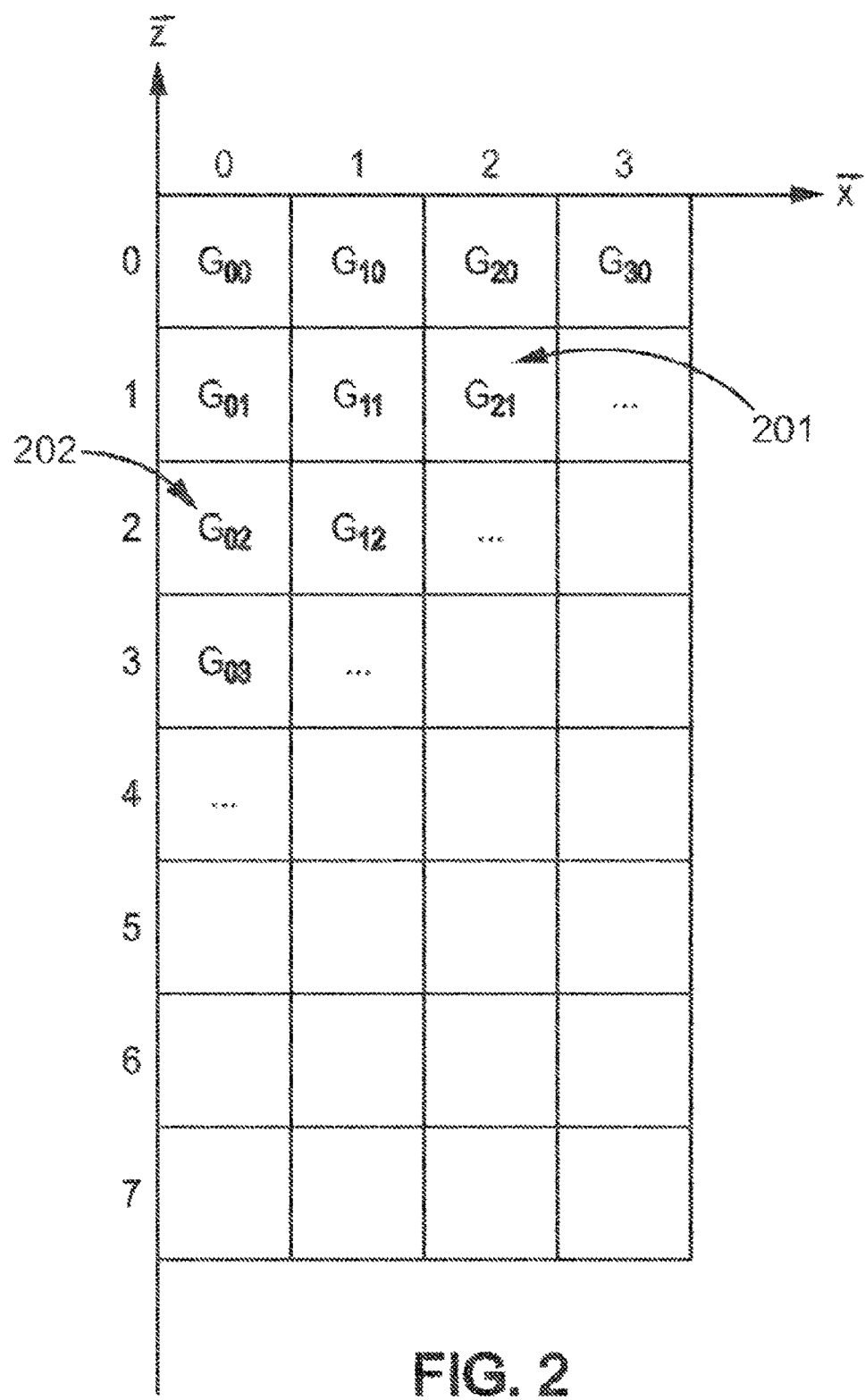
FIG. 2 illustrates a two-dimensional geological model.

FIG. 2 illustrates a two-dimensional geological model. This geological model includes 32 mesh cells (i.e. 4×8 mesh cells) having coordinates in a formed space, the orthonormal frame of reference $(0, \vec{x}, \vec{z})$. These mesh cells (201, 202, etc.) each include a geological parameter ($G_{00}$, $G_{01}$, $G_{10}$, $G_{11}$, $G_{20}$, etc.). This geological parameter can in particular correspond:
to the type of facies of the majority rock in the mesh cell under consideration,
to the permeability of the mesh cell,
to the presence of faults in the mesh cell,
to a parameter of flow of the mesh cell,
to a parameter of porosity of the mesh cell,
to the concentration of calcite of the mesh cell, etc.

This geological parameter ($G_{00}$, $G_{01}$, $G_{10}$, $G_{11}$, $G_{20}$, etc.) is a numerical parameter, decimal for example.

Figure 3:
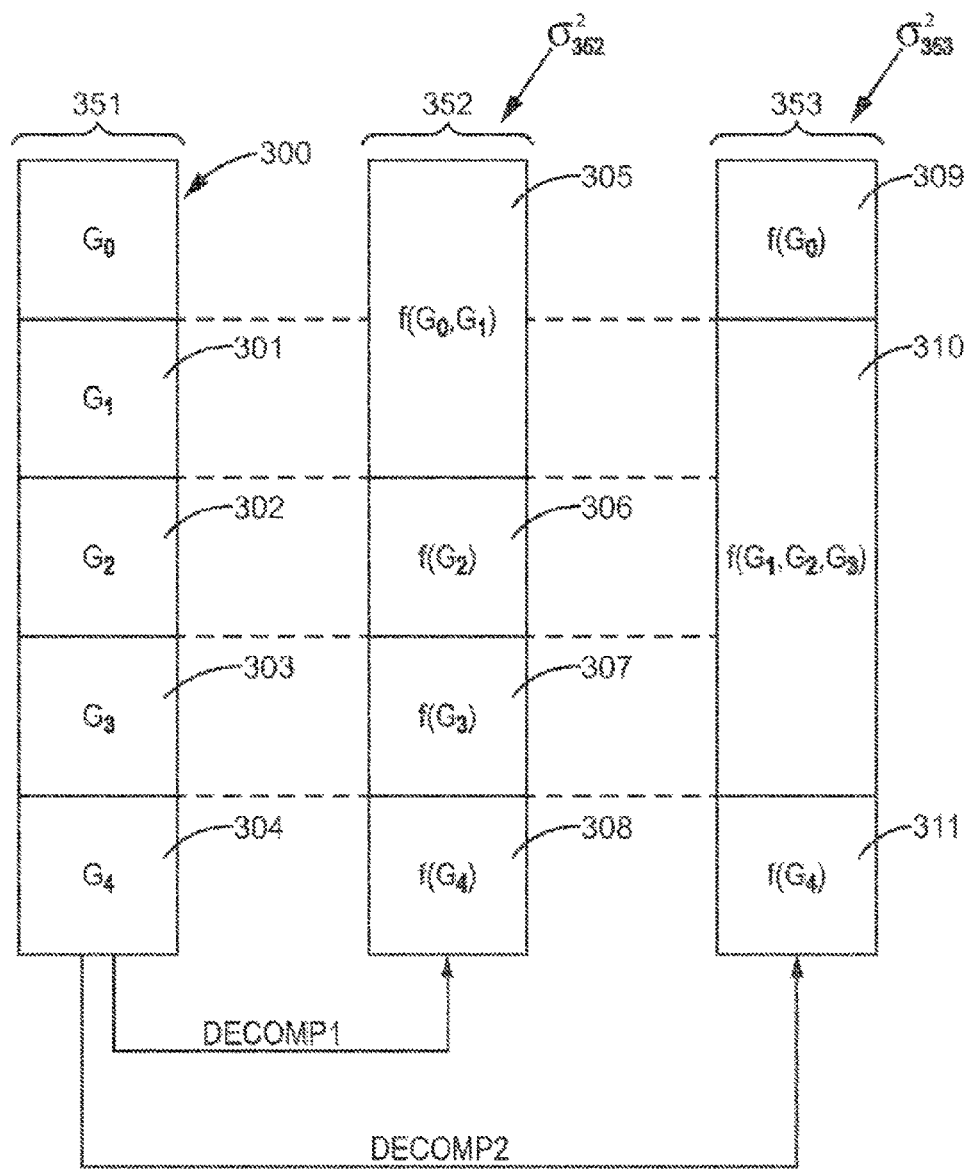
FIG. 3 illustrates a determination of a new numerical subset parameter and for determining the dispersion value in an embodiment of the invention.

FIG. 3 illustrates a determination of a new geological parameter of a subset in a one-dimensional model and according to an embodiment of the invention.

The set 351 of the five mesh cells (300 to 304) forms an initial column and corresponds to the one-dimensional model before any decomposition into subsets. Each mesh cell of this initial column is associated with a geological parameter ($G_0$ is associated with the mesh cell 300, . . . , $G_4$ is associated with the mesh cell 304).

The set 352 corresponds to a possible decomposition of the column 351 into four subsets (305 to 308). The subsets 306, 307 and 308 respectively encompass the mesh cells 302, 303 and 304, while the subset 305 encompasses the two mesh cells 300 and 301. For each of these subsets (305 to 308), it is possible to determine a new geological numerical parameter associated with this subset. For example:

the new geological parameter associated with the subset 305 is a function of the parameters $G_0$ and $G_1$ (denoted $f(G_0, G_1)$);

the new geological parameter associated with the subset 306 is a function of the parameter $G_2$ (denoted $f(G_2)$);

the new geological parameter associated with the subset 307 is a function of the parameter $G_3$ (denoted $f(G_3)$);

the new geological parameter associated with the subset 308 is a function of the parameter $G_4$ (denoted $f(G_4)$).

It is also possible to produce other decompositions of the column 351. Thus, the set 353 corresponds to another decomposition of the column 351, into three subsets (309 to 311). The subsets 309 and 311 respectively encompass the mesh cells 300 and 304, whereas the subset 310 encompasses the three mesh cells 301, 302 and 303. For each of these subsets (309 to 311), it is possible to determine a new geological numerical parameter associated with this subset. For example:

the new geological parameter associated with the subset 309 is a function of the parameter $G_0$ (denoted $f(G_0)$);

the new geological parameter associated with the subset 310 is a function of the parameters $G_1$, $G_2$ and $G_3$ (denoted $f(G_1, G_2, G_3)$);

the new geological parameter associated with the subset 311 is a function of the parameter $G_4$ (denoted $f(G_4)$).

The function f allowing the determination of the new parameter can be, for example, an average function expressed in the following way $$f(G_1, \ldots, G_n) = \sum_i \frac{G_i}{n}.$$

The function f can also be a weighted average function expressed in the following way $$f(G_1, \ldots, G_n) = \sum_i k_i \frac{G_i}{n},$$

wherein $k_i$ can be a geological factor of the mesh cell $30i$ such as the permeability. It is also possible to denote $\overline{G_j}$ this new parameter associated with the subset of index j (by conferring, optionally, an index upon each subset of a decomposition).

Moreover, a dispersion value can be determined for each of the decompositions 352 and 353. The dispersion value notably makes it possible to quantify the loss of heterogeneity of the column during a decomposition.

Thus, this dispersion value can correspond to the value of the interclass variance within the column. Thus, such a variance can be computed in the following way $$\sigma^2 = \sum_{i=1}^{m} (\overline{G_i} - \overline{G_{tot}})^2 \frac{h_i}{h_{tot}}$$

with m the number of subsets determined (i.e. the target number of coarse mesh cells), $\overline{G_i}$ the new geological parameter associated with the subset of index i (as described previously for example), $\overline{G_{tot}}$ the value of a new geological parameter associated with a subset including all the mesh cells of the column (for example, the average of the geological values of the mesh cells of the column), $h_i$ the number of mesh cells contained in the subset of index i, and $h_{tot}$ the total number of mesh cells in the column.

Thus, the higher the dispersion value, the more the heterogeneity of the column is complied with. We can write $\sigma_{352}^2$ the interclass variance of the decomposition 352 and $\sigma_{353}^2$ the interclass variance of the decomposition 353. Thus, in the particular case in FIG. 3, we have:

$$\sigma_{352}^2 = \frac{2}{5}(f(G_0, G_1) - \overline{G_{tot}})^2 + \frac{1}{5}(f(G_2) - \overline{G_{tot}})^2 + \frac{1}{5}(f(G_3) - \overline{G_{tot}})^2 + \frac{1}{5}(f(G_4) - \overline{G_{tot}})^2$$

$$\sigma_{353}^2 = \frac{1}{5}(f(G_0) - \overline{G_{tot}})^2 + \frac{3}{5}(f(G_1, G_2, G_3) - \overline{G_{tot}})^2 + \frac{1}{5}(f(G_4) - \overline{G_{tot}})^2$$

Supposing that $G_1=G_2=G_3=1$ and that $G_0=G_4=0$ and that the function f corresponds to the average function, we have:

$$\sigma_{352}^2 = \frac{2}{5}\left(\frac{1}{2} - \frac{3}{5}\right)^2 + \frac{1}{5}\left(1 - \frac{3}{5}\right)^2 + \frac{1}{5}\left(1 - \frac{3}{5}\right)^2 + \frac{1}{5}\left(0 - \frac{3}{5}\right)^2 \approx 0.15$$

$$\sigma_{353}^2 = \frac{1}{5}\left(0 - \frac{3}{5}\right)^2 + \frac{3}{5}\left(1 - \frac{3}{5}\right)^2 + \frac{1}{5}\left(0 - \frac{3}{5}\right)^2 \approx 0.36$$

The variance $\sigma_{353}^2$ is the maximum variance that it is possible to obtain during a decomposition with these hypotheses.

Thus, by ordering the various decompositions according to the associated dispersion value, it is possible to know the decompositions that comply best with the heterogeneity of the column (i.e. here, the decomposition 353).

Figure 4:
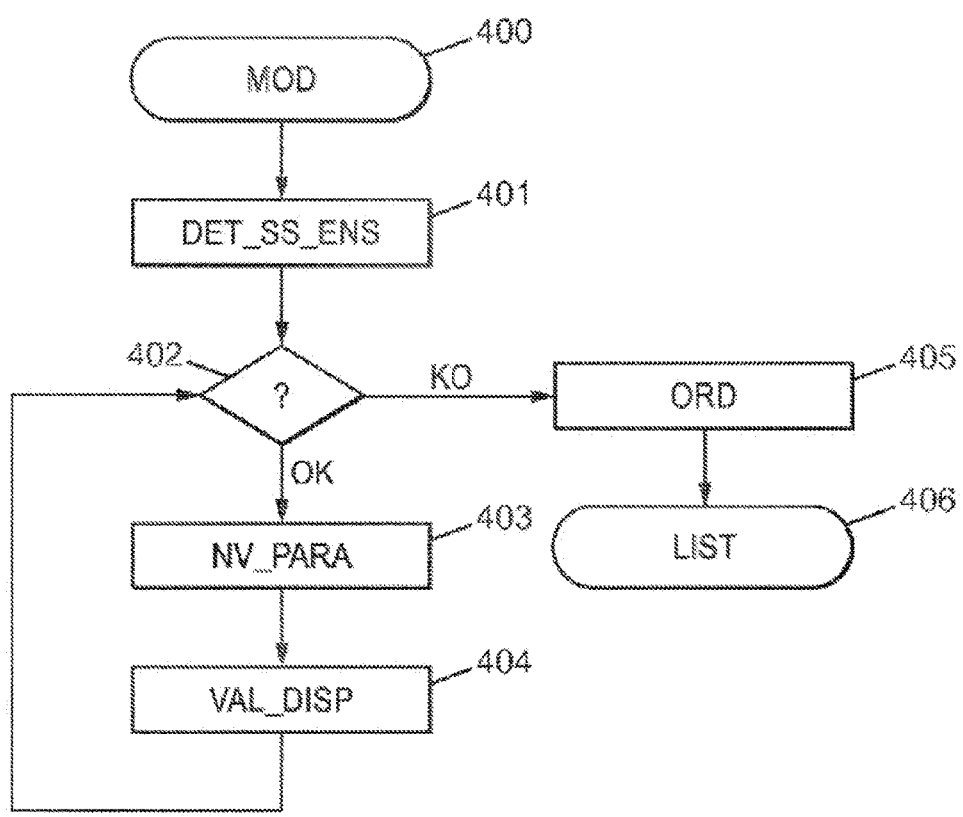
FIG. 4 illustrates a flowchart of a method possible in an embodiment of the invention.

FIG. 4 illustrates a flowchart of a possible method in an embodiment of the invention. On receiving a meshed geological model (400), it is possible to determine a large number of decompositions of columns into subsets of adjacent mesh cells (step 401).

The received model comprises, for example, mesh cells, each mesh cell being cubic and each side of this cube being common with another cube. Moreover, this model can also indicate a set of columns of mesh cells stacked on top of each other, adjacent and representing geological drilling wells.

Thus, for each of these wells, it is possible to determine a plurality of decompositions. The object of such decompositions is to reduce the number of mesh cells of the geological model along the vertical axis (i.e. for successive layers of the model). If all the decompositions are determined then their number is $$\binom{i-1}{f-1} = \frac{(i-1)!}{(f-1)!(i-f)!}$$

with i the initial number of mesh cells in the column, and f the number of subsets in the decomposition (i.e. the number of mesh cells in the target model).

If no dispersion value has been determined for each of the decompositions determined previously (output OK of the test 403), then a decomposition is selected for which no dispersion value has been determined. Then, for each of the subsets of this decomposition, a new geological parameter associated with the subset is computed (step 403), for example, by taking an average of the geological parameters of the mesh cells contained in this subset.

A dispersion value associated with the selected decomposition is then computed (step 404), for example by computing the variance of the means previously computed for the subsets of this decomposition.

Once all the dispersion values are determined for each of the decompositions (output KO of the test 403), it is then possible to order these decompositions as a function of their respective dispersion values (step 405).

Finally this ordered list can be supplied (message 406) to a user or another processing system for display or new calculations. Indeed, the user (for example a geologist or a reservoir engineer) can then select the decomposition that corresponds best to the geological reality observed among the determined decompositions with the highest dispersion values.

Figure 5:
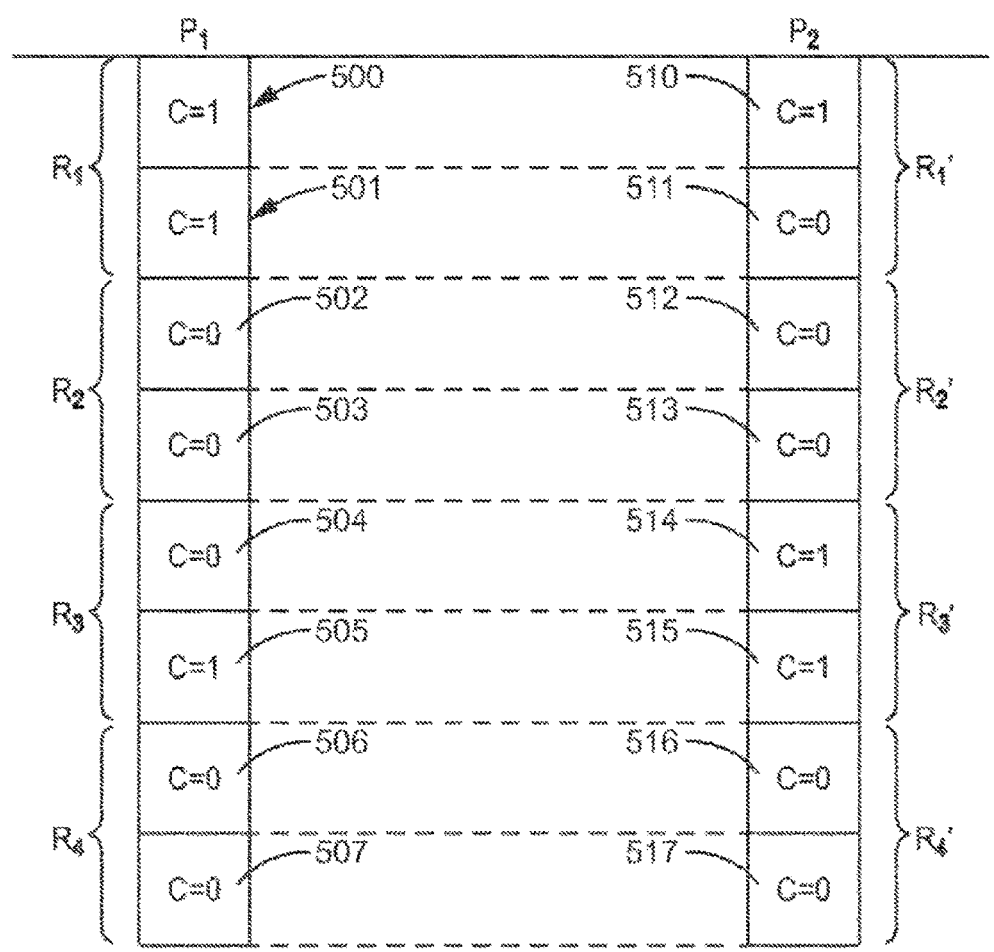
FIG. 5 illustrates groupings constrained by mesh cell completion values in an embodiment of the invention.

FIG. 5 illustrates groupings constrained by completion values of mesh cells in an embodiment of the invention.

Indeed, as has been mentioned previously, the total number of decompositions of a column can be relatively high and it can be time-consuming to analyze them all. It is thus possible to fix a certain number of constraints during the decomposition in order to reduce the number of possible decompositions.

By way of illustration, it is possible to fix the maximum size (in number of mesh cells) of a subset in order to avoid, in particular, "volume transfer" phenomena during simulations. It is also possible to "mark" certain mesh cells in order to make their grouping with mesh cells marked in a different way impossible or difficult. This type of constraint is most often desired in the case of so-called "completion" constraints. The term "completion constraints" refers to any constraint related to the use of the drilling well, such as for example, the opening in the casing of openings allowing the exploitation of layers of oil, gas, etc.

For example, when the casing is open at the level of a given mesh cell (i.e. C=1 with reference to FIG. 5), it is not desirable that this mesh cell is grouped with a mesh cell for which the casing is not open (i.e. C=0). With reference to the well P1 of FIG. 5, the proposed decomposition (R1, R2, R3, R4) causes certain possible groupings to appear whereas other groupings are not possible:

the grouping R1 is possible because the mesh cells 500 and 501 possess the same completion value C=1;
the grouping R2 is possible because the mesh cells 502 and 503 possess the same completion value C=0;
the grouping R3 is not possible because the mesh cells 504 and 505 do not possess an identical completion value;
the grouping R4 is possible because the mesh cells 506 and 507 possess the same completion value C=0.

With reference to the well P2 of FIG. 5, it is possible to follow a similar reasoning:

the grouping R1' is not possible because the mesh cells 510 and 511 do not possess an identical completion value;

the grouping R2' is possible because the mesh cells 512 and 513 possess the same completion value C=0;
the grouping R3' is possible because the mesh cells 514 and 515 possess the same completion value C=1;
the grouping R4' is possible because the mesh cells 516 and 517 possess the same completion value C=0;

Thus, each mesh cell of the wells P1 and P2 is associated with a numerical completion value representing a degree of completion of the mesh cell. Of course, this completion value is not necessarily 1 or 0. It can also be equal to 0.9 or 0.2 or any other numerical value.

It is also possible to prohibit the grouping of two mesh cells if the values of completion of these two mesh cells differ by more than a threshold $\Delta$. By generalizing to a grouping of several mesh cells, the completion value of each mesh cell of this grouping (or subset) cannot differ from the completion values of the other mesh cells of this grouping by at most a threshold $\Delta$.

It can be advantageous to produce the mesh cell groupings in an identical way between the various columns in order to be able to construct a regular mesh within a coarser model. To do this, the constraints imposed within a column can have repercussions on the other columns of the model. Still with reference to FIG. 5, the columns of wells P1 and P2 include mesh cells (500 to 507 and 510 to 517 respectively) each associated with a completion value. It is possible to match the mesh cells of these two wells as a function of their "depth" (i.e. their position in their respective column). Thus, the mesh cell 500 can be matched with the mesh cell 510, the mesh cell 501 can be matched with the mesh cell 511 ... and the mesh cell 507 can be matched with the mesh cell 517.

In order to ensure a regular coarse meshing, it is possible to associate with the mesh cells of the first column the completion values of the second column as a function of the match described above. These values are then called "virtual completion value". By way of illustration, the virtual completion value of the mesh cell 504 is C=1 (because the mesh cell matching the mesh cell 504 is the mesh cell 514 in the second column and its completion value has a value of C=1). Similarly, the virtual completion value of the mesh cell 501 is C=0 (because the mesh cell matching the mesh cell 501 is the mesh cell 511 in the second column and its completion value has a value of C=0).

The process described above can be then performed by transposing the completion values with the virtual completion values.

Thus, to check whether or not a grouping is possible between several mesh cells of a column, it is possible to check that the virtual completion value of each mesh cell of this grouping differs from the virtual completion values of the other mesh cells of this same grouping by at most a $\Delta$.

The threshold $\Delta$ can be fixed in advance in a configuration file or dynamically as a function of the results of a first decomposition process. An intermediate solution can consist in a fixing of the threshold $\Delta$ at a fairly low initial numerical value (0 for example) then in incrementally modifying its value upward, if the number of determined decompositions is not high enough.

Figure 6:
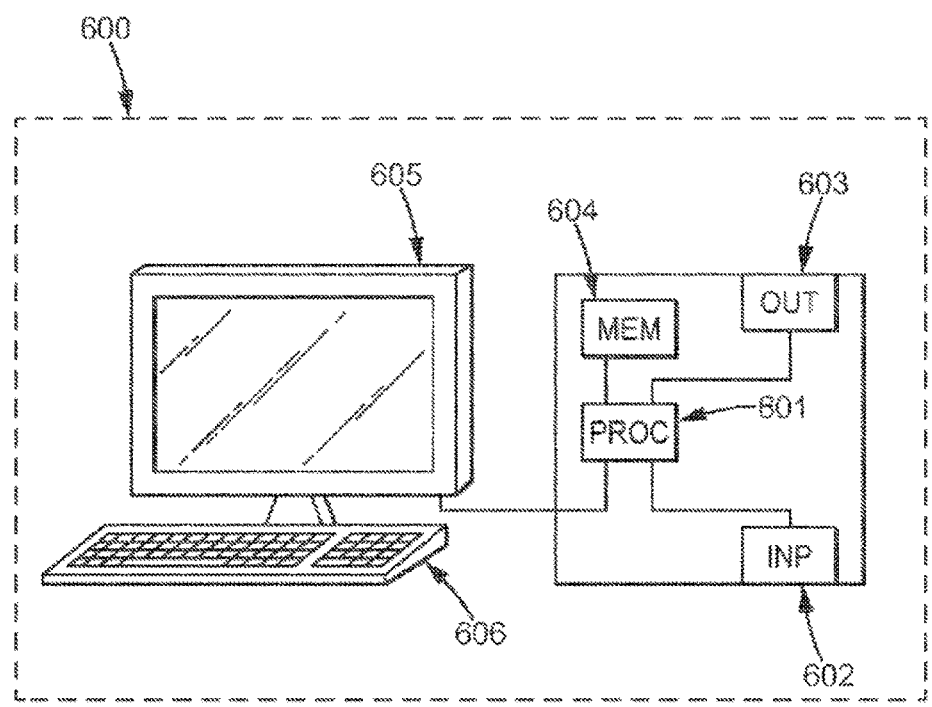
FIG. 6 illustrates a device able to implement the method of the invention in a particular embodiment.

FIG. 6 represents an example of a device 600 of groupings of mesh cells in a meshed geological model in an embodiment of the invention.

In this embodiment, the device 600 includes a computer, comprising a memory 604 for storing instructions allowing the implementation of the method, the received model data, and temporary data for performing the various steps of the method as described previously.

The computer furthermore includes a mesh cell grouping circuit 601. This circuit can be, for example:
- a processor capable of interpreting instructions in the form of a computer program, or
- an electronic card in which the steps of the method of the invention are described in the silicon, or else
- a programmable electronic chip such as an FPGA (Field-Programmable Gate Array) chip.

This computer includes an input interface 602 for receiving meshed geological models data, and an output interface 603 for the provision of decomposition data. Finally, the computer includes, to allow easy interaction with a user, a screen 605 and a keyboard 606.

Moreover, the operational scheme presented in FIG. 4 is a typical example of a program, certain instructions of which can be performed on the device described. In this way, FIG. 4 can correspond to the flow chart of the general algorithm of a computer program in the sense of the invention.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

For example, all the explanations given and all the information supplied for models in one, two or three dimensions can be transposed to models with other dimensions among the one, two or three-dimensional models.

The invention claimed is:

1. A method of determining a hydrocarbon recovery rate from an oil well using a meshed geological model based on a real geological subsoil data, the meshed geological model being of one to three dimensions,
    the meshed geological model including a plurality of mesh cells,
    each mesh cell of said model being associated with at least one numerical parameter representing a geological property,
    the method including the steps:
    for at least one column of at least n mesh cells of the model:
        a/ determining a plurality of decompositions of said column into m subsets of adjacent mesh cells, m being a positive or zero integer less than or equal to n;
        for each decomposition determined:
            a1/ for each of the m subsets, determining a new numerical parameter associated with said subset as a function of the numerical parameters associated with the mesh cells of said subset;
            a2/ determining a dispersion value of said decomposition as a function, at least, of the new numerical parameters associated with said subsets determined in step a1/;
        b/ supplying said decompositions associated with their dispersion value, wherein n is a strictly positive integer; and
        determining a geological structure of the soil based on said model and said decomposition to improve the hydrocarbon recovery rate of the oil well;
        determining the hydrocarbon recovery rate from the oil well using said meshed geological model.

2. The method as claimed in claim 1, wherein the method furthermore comprises:
    c/ ordering said decompositions supplied in step b/ according to the dispersion value determined for each of the decompositions; and
    d/ supplying an ordered list of said decompositions.

3. The method as claimed in claim 2, wherein, the steps being executed for a plurality of columns, the columns being distinct and pair-wise parallel,
    each decomposition determined for a column of the plurality of columns possessing an equivalent decomposition in each of other columns;
    the method furthermore comprises:
        e/ for each decomposition of the columns of the plurality of columns, correcting the determined dispersion values as a function of the dispersion value of the decomposition and the dispersion values of the equivalent decompositions of other columns.

4. The method as claimed in claim 3, wherein, each column including an importance parameter, the dispersion value of each decomposition is a function of said importance parameter of the column.

5. The method as claimed in claim 4, wherein all possible decompositions of the column are determined in step a/.

6. The method as claimed in claim 4, wherein, each mesh cell of the column being associated with a completion value (C) representing a degree of completion of the mesh cell,
    the plurality of decompositions is determined in step a/ in such a way that the completion value of each mesh cell of each of the m subsets differs from the completion values of other mesh cells of a same subset by at most a determined threshold.

7. The method as claimed in claim 1, wherein, the geological model being a two or three-dimensional meshed model,
    each mesh of each column being associated with a completion value representing a degree of completion of the mesh,
    each mesh of the first column being associated with a completion value associated with a mesh of the second column, known as the virtual completion value,
    the plurality of decompositions for the first column is determined in step a/ in such a way that the virtual completion value of each mesh cell of each of the m subsets differs from the virtual completion values of other mesh cells of a same subset by at most a determined threshold.

8. The method as claimed in claim 6, wherein the determined threshold is equal to 0.

9. The method as claimed in claim 6, wherein the determined threshold is less than half a difference between a highest completion value and a lowest completion value associated with the mesh cells of the column.

10. The method as claimed in claim 7, wherein the determined threshold is less than half the difference between a highest virtual completion value and a lowest virtual completion value associated with the mesh cells of the first column.

11. The method as claimed in claim 1, wherein the dispersion value of a decomposition is determined as a function of an interclass variance of the determined subsets.

12. The method as claimed in claim 1, wherein, each mesh cell of the column is associated with a heterogeneity value representing a geological parameter of the subsoil,
the plurality of decompositions is determined in step a/ in such a way that the heterogeneity value of each mesh cell of each of the m subsets differs from the heterogeneity values of other mesh cells of a same subset by at most a determined threshold.

13. A non-transitory computer readable storage medium, having stored thereon a computer program comprising a program for determining decompositions of a meshed geological model based on a real geological subsoil data from an oilfield, the meshed geological model being of one to three dimensions,
the geological model including a plurality of mesh cells, each mesh cell of said model being associated with at least one numerical parameter ($G_{00}$, $G_{01}$, $G_{02}$) representing a geological property,
the computer program loaded into a data-processing unit and adapted to cause the data-processing unit to carry out the steps of
for at least one column of at least n mesh cells of the model:
   a/ determining a plurality of decompositions of said column into m subsets of adjacent mesh cells, m being a positive or zero integer less than or equal to n;
   for each decomposition determined:
      a1/ for each of the m subsets, determining a new numerical parameter associated with said subset as a function of the numerical parameters associated with the mesh cells of said subset;
      a2/ determining a dispersion value of said decomposition as a function, at least, of the new numerical parameters associated with said subsets determined in step a1/;
   b/ supplying said decompositions associated with their dispersion value, wherein n is a strictly positive integer;
   c/ determining a geological structure of the soil based on said model to improve the hydrocarbon recovery rate from a oil well; and
   d/ determining the hydrocarbon recovery rate from the oil well using the meshed geological model.

14. A device for determining decompositions of a meshed geological model based on a real geological subsoil data from an oilfield, the meshed geological model being of one to three-dimensions,
the geological model including a plurality of mesh cells, each mesh cell of said model being associated with at least one numerical parameter representing a geological property,
the device including:
   an electronic circuit programmed for, for at least one column of at least n mesh cells of the model:
      determining a plurality of decompositions of the column into m subsets of adjacent mesh cells, m being a positive or zero integer less than or equal to n;
      for each determined decomposition:
         a1/ for each of the m subsets, determining a new numerical parameter associated with said subset as a function of the numerical parameters associated with the mesh cells of said subset;
         a2/ determining a dispersion value of said decomposition as a function, at least, of the new numerical parameters associated with said subsets;
   an output interface for supplying said decompositions associated with their dispersion value,
wherein n is a strictly positive integer; and
wherein the device further comprises an electronic circuit capable of determining a geological structure of the soil based on said model and said decomposition to improve the determination of a hydrocarbon recovery rate;
wherein the device further comprises an electronic circuit capable of determining the hydrocarbon recovery rate from the oil well using the meshed geological model.

* * * * *